United States Patent
Claus et al.

(10) Patent No.: US 7,805,357 B2
(45) Date of Patent: Sep. 28, 2010

(54) SYSTEM AND METHOD FOR ROUTING TRADING ORDERS IN AN ELECTRONIC TRADING SYSTEM USING TRADER LISTS

(75) Inventors: Matthew W. Claus, Summit, NY (US); Kevin M. Foley, New York, NY (US); Nigel J. Renton, London (GB)

(73) Assignee: BGC Partners, Inc., New York, NY (US)

( * ) Notice: Subject to any disclaimer, the term of this patent is extended or adjusted under 35 U.S.C. 154(b) by 333 days.

(21) Appl. No.: 11/495,236

(22) Filed: Jul. 27, 2006

(65) Prior Publication Data

US 2007/0027796 A1 Feb. 1, 2007

Related U.S. Application Data

(60) Provisional application No. 60/703,623, filed on Jul. 29, 2005.

(51) Int. Cl.
*G06Q 40/00* (2006.01)

(52) U.S. Cl. ............... 705/37; 705/1; 705/14; 705/35; 705/36 R; 705/80

(58) Field of Classification Search ............ 705/36 R, 705/37, 80, 1, 14, 35
See application file for complete search history.

(56) References Cited

U.S. PATENT DOCUMENTS

| | | | | |
|---|---|---|---|---|
| 5,136,501 | A | 8/1992 | Silverman et al. | 364/408 |
| 5,842,178 | A | 11/1998 | Giovannoli | 705/26 |
| 5,924,083 | A * | 7/1999 | Silverman et al. | 705/37 |
| 6,317,727 | B1 | 11/2001 | May | 705/37 |
| 6,421,653 | B1 | 7/2002 | May | 705/37 |
| 6,505,174 | B1 * | 1/2003 | Keiser et al. | 705/36 R |
| 6,985,883 | B1 * | 1/2006 | Togher et al. | 705/37 |
| 7,003,488 | B2 | 2/2006 | Dunne et al. | 705/37 |
| 7,006,991 | B2 * | 2/2006 | Keiser et al. | 705/37 |
| 7,024,386 | B1 * | 4/2006 | Mills et al. | 705/37 |
| 7,110,972 | B1 | 9/2006 | Handa et al. | 705/37 |
| 7,222,089 | B2 | 5/2007 | Harpale | 705/26 |

(Continued)

FOREIGN PATENT DOCUMENTS

JP 2001-249962 9/2001

(Continued)

OTHER PUBLICATIONS

Merriam-Webster Online Dictionary, Def. "associate".*

(Continued)

*Primary Examiner*—Ella Colbert
*Assistant Examiner*—B. Joan Amelunxen
(74) *Attorney, Agent, or Firm*—Thomas D. Bradshaw

(57) ABSTRACT

A system for managing trading orders comprises a memory operable to store a trader list that is associated with a first trader and that designates one or more other traders. The system further comprises a processor communicatively coupled to the memory and operable to receive a trading order from the first trader. The processor is further operable to transmit the trading order to a plurality of traders, wherein the plurality of traders does not comprise any of the one or more designated traders from the trader list. The processor is further operable to prevent the transmission of the trading order to the one or more designated traders.

62 Claims, 5 Drawing Sheets

U.S. PATENT DOCUMENTS

| | | | |
|---|---|---|---|
| 7,246,092 B1* | 7/2007 | Peterson et al. | 705/37 |
| 7,249,080 B1* | 7/2007 | Hoffman et al. | 705/36 R |
| 7,366,690 B1* | 4/2008 | Howorka et al. | 705/35 |
| 7,386,497 B1* | 6/2008 | Gooch | 705/37 |
| 7,398,244 B1* | 7/2008 | Keith | 705/37 |
| 2001/0042040 A1* | 11/2001 | Keith | 705/37 |
| 2002/0004776 A1 | 1/2002 | Gladstone | 705/37 |
| 2002/0010672 A1 | 1/2002 | Waelbroeck et al. | 705/37 |
| 2002/0029180 A1* | 3/2002 | Kirwin et al. | 705/37 |
| 2002/0032635 A1 | 3/2002 | Harris et al. | 705/37 |
| 2002/0099641 A1 | 7/2002 | Mills et al. | 705/37 |
| 2002/0156716 A1 | 10/2002 | Adatia | 705/37 |
| 2002/0161624 A1 | 10/2002 | Bradlee | 705/10 |
| 2003/0028461 A1 | 2/2003 | Kohorn | 705/36 |
| 2003/0028496 A1* | 2/2003 | Yearworth et al. | 705/80 |
| 2003/0033240 A1 | 2/2003 | Balson et al. | 705/37 |
| 2003/0154100 A1* | 8/2003 | Sato et al. | 705/1 |
| 2003/0200167 A1 | 10/2003 | Kemp, II et al. | 705/37 |
| 2003/0220867 A1 | 11/2003 | Goodwin et al. | 705/37 |
| 2004/0034591 A1* | 2/2004 | Waelbroeck et al. | 705/37 |
| 2004/0059666 A1 | 3/2004 | Waelbroeck et al. | 705/37 |
| 2004/0073506 A1 | 4/2004 | Tull, Jr. et al. | 705/36 |
| 2004/0122761 A1 | 6/2004 | Thierer et al. | 705/37 |
| 2004/0138904 A1* | 7/2004 | La Loggia | 705/1 |
| 2004/0153392 A1 | 8/2004 | West et al. | 705/37 |
| 2004/0210511 A1 | 10/2004 | Waelbroeck et al. | 705/37 |
| 2004/0236669 A1 | 11/2004 | Horst et al. | 705/37 |
| 2004/0254877 A1 | 12/2004 | Buckwalter et al. | 705/37 |
| 2004/0260640 A1 | 12/2004 | Crosthwaite et al. | 705/37 |
| 2005/0096931 A1* | 5/2005 | Baker et al. | 705/1 |
| 2005/0102220 A1 | 5/2005 | Stackpole | 705/37 |
| 2005/0108143 A1 | 5/2005 | Beadle et al. | 705/37 |
| 2005/0144109 A1 | 6/2005 | Boni et al. | 705/36 |
| 2005/0149428 A1* | 7/2005 | Gooch et al. | 705/37 |
| 2005/0228739 A1 | 10/2005 | Leibowitz | 705/37 |
| 2006/0041498 A1 | 2/2006 | Hausman et al. | 705/37 |
| 2006/0080216 A1 | 4/2006 | Hausman et al. | 705/37 |
| 2006/0095327 A1* | 5/2006 | Vaughn et al. | 705/14 |
| 2006/0112002 A1 | 5/2006 | Holland et al. | 705/37 |
| 2006/0190386 A1* | 8/2006 | Levy | 705/37 |
| 2006/0247997 A1 | 11/2006 | West et al. | 705/37 |
| 2007/0005487 A1 | 1/2007 | Keith | 705/37 |
| 2007/0233595 A1 | 10/2007 | Nordlicht et al. | 705/37 |
| 2007/0276748 A1* | 11/2007 | Shapiro et al. | 705/37 |
| 2008/0040254 A1* | 2/2008 | Waelbroeck et al. | 705/37 |
| 2008/0040255 A1* | 2/2008 | Shapiro et al. | 705/37 |

FOREIGN PATENT DOCUMENTS

| | | | |
|---|---|---|---|
| WO | WO 01/50776 A2 | 7/2001 | |

OTHER PUBLICATIONS

Liu, Chen-Ching, *Decision Support Tools for Trading in Deregulated Energy Systems*, Advanced Power Technologies (APT) Center, University of Washington, IEEE, pp. 409-410, 2001.

Moldovan, et al., *Trading in the Market: An Experiment in Group Decision Dynamics*, IEEE, 6 pages, 2003.

Schoreels, et al., *Agent Based Genetic Algorithm Employing Financial Technical Analysis for Making Trading Decisions Using Historical Equity Market Data*, IEEE, pp. 421-424, 2004.

*Journal of Beijing University of Technology*, The British Library—"The World's Knowledge", vol. 30, No. 2, 5 pages, Jun. 2004.

Patent Pending Application entitled *System and Method for Limiting Aggressive Trading in an Electronic Trading System*, by Matthew W. Claus, et al., 34 total pages, filed Jul. 27, 2006.

Patent Pending Application entitled *System and Method for Using Trader Lists in an Electronic Trading System to Route a Trading Order with a Reserved Size*, by Matthew W. Claus, et al, 44 total pages, filed Jul. 27, 2006.

*Notification of Transmittal of the International Search Report and the Written Opinion of the International Searching Authority* for International Application No. PCT/US06/29679; 9 pages, Aug. 20, 2007.

*United States Patent and Trademark Office; Office Action* for U.S. Appl. No. 11/495,254, filed Jul. 27, 2006 in the name of Matthew W. Claus; 10 pages.

*Notification of Transmittal of the International Search Report and the Written Opinion of the International Searching Authority* for International Application No. PCT/US06/29472; 7 pages, Jul. 31, 2007.

*United States Patent and Trademark Office; Office Action* for U.S. Appl. No. 11/495,235, filed Jul. 27, 2006 in the name of Matthew W. Claus; 13 pages.

U.S. PTO Office Action for U.S. Appl. No. 11/495,235; 13 pages; May 12, 2009.

* cited by examiner

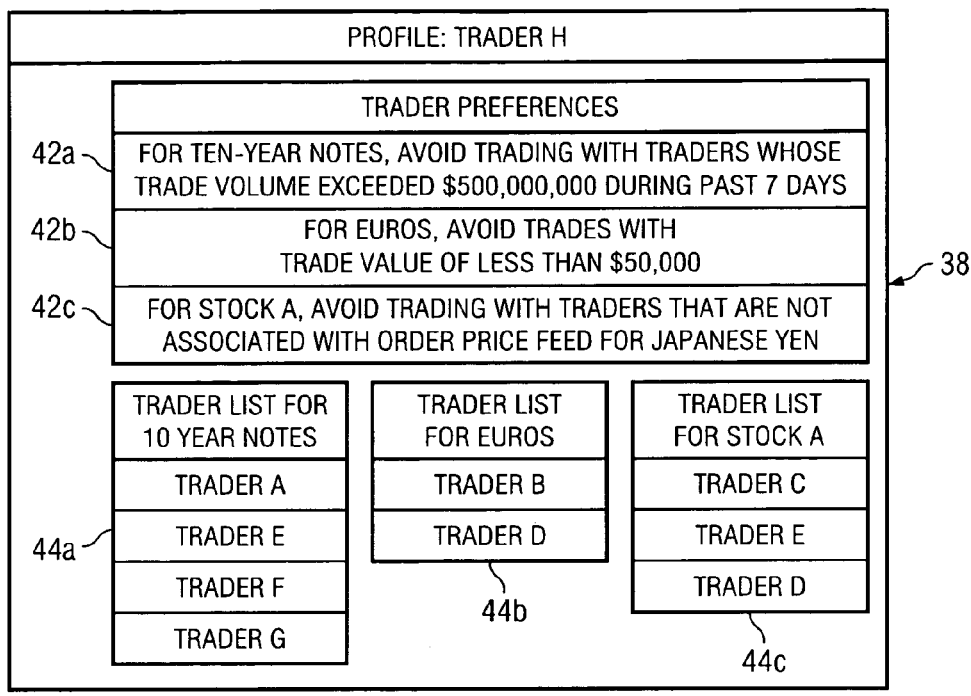
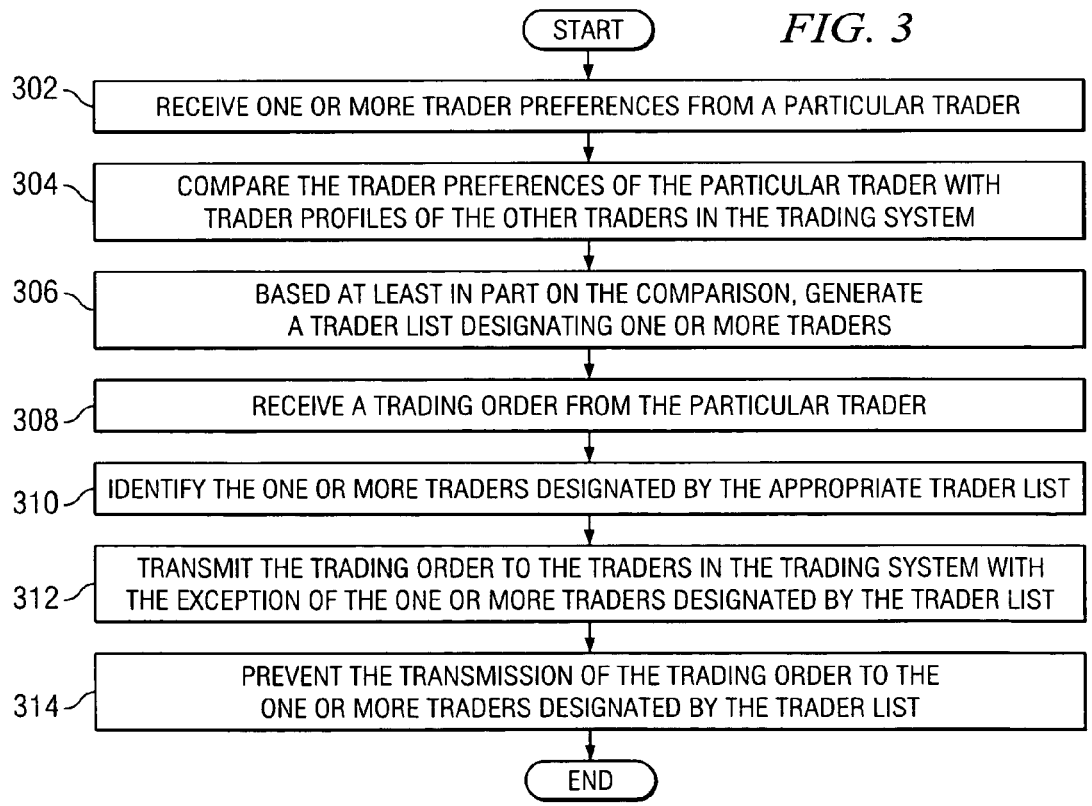

SYSTEM AND METHOD FOR ROUTING TRADING ORDERS IN AN ELECTRONIC TRADING SYSTEM USING TRADER LISTS

RELATED APPLICATION

This patent application claims priority from Patent Application Ser. No. 60/703,623, filed Jul. 29, 2005 entitled: System and Method for Limiting Aggressive Trading in an Electronic Trading System.

TECHNICAL FIELD OF THE INVENTION

The present invention relates generally to electronic trading and, more specifically, to a system for routing trading orders in an electronic trading system using trader lists.

BACKGROUND OF THE INVENTION

In recent years, electronic trading systems have gained wide spread acceptance for trading of a wide variety of items, such as goods, services, financial instruments, and commodities. For example, electronic trading systems have been created that facilitate the trading of financial instruments and commodities such as stocks, bonds, currency, futures contracts, oil, and gold.

Many of these electronic trading systems use a bid/offer process in which bids and offers are submitted to the systems by a passive side and then those bids and offers are hit or lifted (or taken) by an aggressive side. For example, a passive trading counterparty may submit a "bid" to buy a particular trading product. In response to such a bid, an aggressive side counterparty may submit a "hit" in order to indicate a willingness to sell the trading product to the first counterparty at the given price. Alternatively, a passive side counterparty may submit an "offer" to sell the particular trading product at the given price, and then the aggressive side counterparty may submit a "lift" (or "take") in response to the offer to indicate a willingness to buy the trading product from the passive side counterparty at the given price.

SUMMARY OF THE INVENTION

In accordance with the present invention, the disadvantages and problems associated with prior electronic trading systems have been substantially reduced or eliminated.

In one embodiment, a system for managing trading orders comprises a memory operable to store a trader list that is associated with a first trader and that designates one or more other traders. The system further comprises a processor communicatively coupled to the memory and operable to receive a trading order from the first trader. The processor is further operable to transmit the trading order to a plurality of traders, wherein the plurality of traders does not comprise any of the one or more designated traders from the trader list. The processor is further operable to prevent the transmission of the trading order to the one or more designated traders.

In another embodiment, a system for managing trading orders comprises a platform server operable to receive a trading order from a first trader, wherein the first trader is associated with a trader list that designates one or more other traders. The platform server is further operable to transmit the trading order to a plurality of traders. The system further comprises an interface server associated with at least one designated trader from the trader list, wherein the interface server is communicatively coupled to the platform server and operable to store the trader list. The interface server is further operable to prevent the transmission of the trading order to the at least one designated trader from the trader list.

In another embodiment, a method for managing trading orders comprises storing a trader list that is associated with a first trader and that designates one or more other traders. The method continues by receiving a trading order from the first trader. The method continues by transmitting the trading order to a plurality of traders, wherein the plurality of traders does not comprise any of the one or more designated traders from the trader list. The method concludes by preventing the transmission of the trading order to the one or more designated traders.

Various embodiments of the present invention may benefit from numerous advantages. It should be noted that one or more embodiments may benefit from some, none, or all of the advantages discussed below.

One advantage is that the trading platform uses trader lists that assist traders in managing risks associated with trading. For example, a particular trader may perceive that trades with highly specialized traders are not likely to be profitable. Based on this perception, the particular trader may configure a trader list to designate those highly specialized traders with which the particular trader does not want to trade. When the particular trader submits a trading order and/or an order price feed, the trading platform may transmit the trading order and/or the order price feed to the other traders in the trading system, with the exception of those traders designated by the trader list. Thus, the trading platform may prevent trades that the particular trader believes would be unprofitable.

Another advantage is that, by using trader lists, the trading platform may limit or eliminate small trades that are perceived as nuisances. For example, a particular trader may submit, as a trading order, an offer to trade a large quantity of a particular trading product. In a system without trader lists, small traders would receive the trading order and attempt to aggress relatively small portions of the total quantity of the trading order. The particular trader that submitted the trading order might perceive such small transactions as nuisances. To eliminate these nuisances, the trading platform allows the particular trader to configure a trader list that designates those traders in the trading system that are prone to aggress against relatively small portions of a large bid or offer. Thus, when the particular trader submits a trader order, the trading platform may transmit the trading order to the other traders in trading system, with the exception of those small traders designated by the trader list. Thus, by allowing traders to configure trader lists, the trading platform may assist traders in managing risks and in avoiding nuisance-type trades.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 2A illustrates an example of a trader profile, according to certain embodiments of the present invention;

FIG. 3 illustrates a flowchart for generating and using trader lists to process trading orders, according to certain embodiments of the present invention;

DETAILED DESCRIPTION OF THE INVENTION

Figure 1:
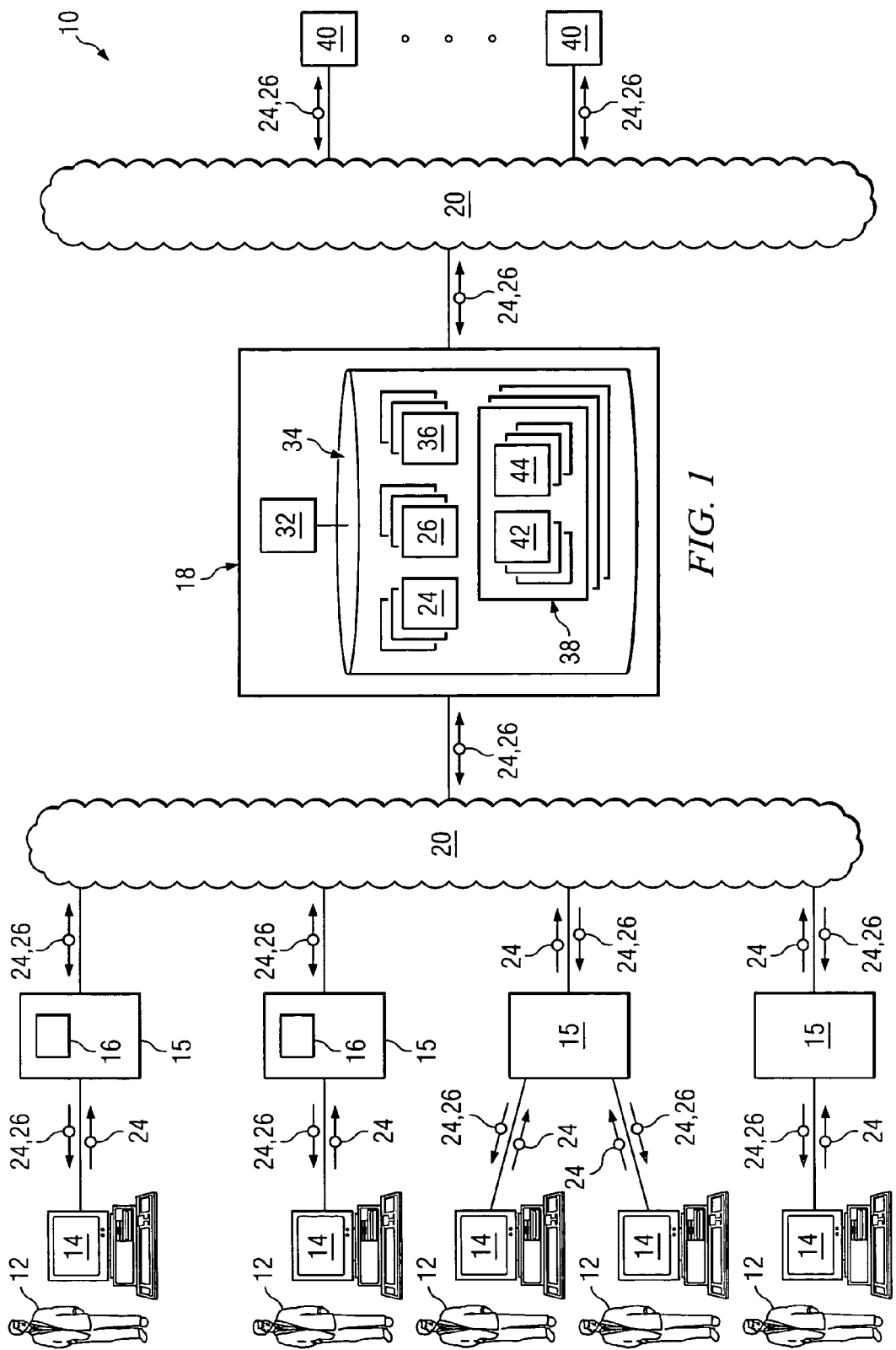
FIG. 1 illustrates one embodiment of a trading system in accordance with the present invention.

FIG. 1 illustrates a trading system 10 according to certain embodiments of the present invention. System 10 may include one or more terminals 14 coupled to a trading platform 18 by one or more communications networks 20. Generally, trading system 10 may receive and process trading orders 24 from traders 12. More specifically, trading system 10 may generate for a particular trader 12 a trader list 44 that designates one or more other traders 12 with whom the particular trader 12 does not want to trade. Upon receiving trading order 24 from the particular trader 12, trading system 10 may prevent the transmission of the received trading order 24 to traders 12 designated by trader list 44 associated with the particular trader 12. By using trader list 44 to process trading order 24, trading platform 18 may assist trader 12 in avoiding a trade between trader 12 and those traders 12 that are designated by trader list 44.

Trading system 10 comprises one or more terminals 14. Terminal 14 represents any suitable local or remote end-user devices that may be used by traders 12 to access one or more elements of trading system 10, such as trading platform 18. Terminal 14 may comprise a computer, workstation, telephone, Internet browser, electronic notebook, Personal Digital Assistant (PDA), pager, or any other suitable device (wireline, wireless, or both), component, or element capable of receiving, processing, storing, and/or communicating information with other components of system 10. Terminal 14 may also comprise any suitable user interface such as a display, microphone, keyboard, or any other appropriate terminal equipment according to particular configurations and arrangements. It will be understood that there may be any number of terminals 14 communicatively connected to trading platform 18.

In some embodiments, terminal 14 may be communicatively coupled to interface server 15. Interface server 15 is generally operable to transmit trading orders 24, order price feeds 26, and market data between terminal 14 and trading platform 18. A particular interface server 15 that is coupled to terminal 14 for a particular trader 12 may store one or more trader profiles 38, trader preferences 42, and trader lists 44 (described below) associated with one or more traders 12. Based at least in part on trader profile 38, interface server 15 may prevent the disclosure of one or more trading orders 24 and/or one or more order price feeds 26 to trader 12. In particular, interface server 15 may use trader list 38 to filter particular trading orders 24 from a stream of market data received from trading platform 18. A particular interface server 15 may be communicatively coupled to any number and combination of terminals 14. Interface server 15 represents a general-purpose personal computer (PC), a Macintosh, a workstation, a Unix-based computer, a server computer, or any suitable processing device. Interface server 15 may include any hardware, software, firmware, or combination thereof operable to perform the functions and/or operations described above.

Terminals 14 are operable to receive trading orders 24 from traders 12 and to send trading orders 24 to trading platform 18. Trading orders 24 may comprise orders to trade products such as, for example, stocks, equity securities, bonds, mutual funds, options, futures, derivatives, currencies, other financial instruments, or any suitable trading product. Such trading orders 24 may comprise bids, offers, market orders, limit orders, stop loss orders, day orders, open orders, GTC ("good till cancelled") orders, "good through" orders, "all or none" orders, "any part" orders, or any other order suitable for trading.

The various types of trading orders 24 in trading system 10 may generally be characterized as either passive trading orders 24 or aggressive trading orders 24. An aggressive trading order 24 is an order that activates or triggers a trade. In contrast, a passive trading order 24 is an order that does not, by itself, activate or trigger a trade. A "hit" and a "take" (e.g., "lift") are examples of aggressive trading orders 24. A "bid" and an "offer" are generally examples of passive trading orders 24. (In some situations, however, a bid or an offer may be considered an aggressive trading order 24. For example, if trader 12 submits an offer that is below the best bid price, the offer may trigger or activate a trade and, therefore, be considered an aggressive trading order 24.) An example illustrates passive and aggressive trading orders 24. A passive trader 12 may submit a "bid" to buy a particular amount of product A at a given price. In response to such a bid, an aggressive trader 12 may submit a "hit" to activate or trigger a sale of the particular amount of product A to the passive trader 12 at the given price. In this example, the bid is a passive trading order 24 and the hit is an aggressive trading order 24. As another example, a passive trader 12 may submit an "offer" to indicate a willingness to sell a particular amount of product A at a given price. Subsequently, an aggressive trader 12 may submit a "lift" (or "take") in response to the offer to activate or trigger the purchase of the particular amount of product A at the given price from the passive trader 12. In this example, the offer is a passive trading order 24 and the lift (or take) is an aggressive trading order 24.

Although terminals 14 are described herein as being used by "traders" 12, it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 24 in system 10. Certain traders 12 may be customers 12a. Other traders 12 may be market makers 12b.

Market maker 12b is any individual, firm, or other entity that submits and/or maintains either or both bid and offer trading orders 24 simultaneously for the same instrument. For example, market maker 12b may be a brokerage or bank that maintains either a firm bid and/or offer price in a given security by standing ready, willing, and able to buy and/or sell that security at publicly quoted prices. Market maker 12b generally displays bid and/or offer prices for specific numbers of specific securities, and if these prices are met, market maker 12b will immediately buy for and/or sell from its own accounts. According to certain embodiments, a single trading order 24 may be filled by a number of market makers 12b at potentially different prices.

Customer 12a may be any user of trading system 10 that is not a market maker 12b. Customer 12a may be an individual investor, an agent acting on behalf of a principal, a principal, an individual, a legal entity (such as a corporation), or any machine or mechanism that is capable of placing and/or responding to trading orders 24 in system 10.

In some embodiments, market makers 12b may include individuals, firms or other entities that are granted particular privileges such that trading orders 24 received from such individuals, firms or other entities are treated as being received from a traditional market maker 12b (such as a brokerage or bank, for example). For example, certain individuals, firms or other entities that may otherwise be treated as customers 12a may be granted privileges to be treated as market makers 12b for the purposes of the systems and methods discussed herein. To receive market maker privileges, an individual, firm or other entity may be required to pay a fee, pay a commission, or submit and/or simultaneously maintain both bid and offer trading orders 24 for particular instruments. According to certain embodiments, an individual, firm or other entity may be designated as a market maker 12b for particular instruments but as a customer 12a for other instruments.

In some embodiments, a multi-tiered system of market makers 12b may be employed. Trading platform 18 may grant different privileges to different market makers 12b based on one or more criteria such as, for example, whether market maker 12b is associated with an electronic feed, whether market maker 12b is a strong trader, or whether market maker 12b has particular information. Market makers 12b may be categorized into different tiers for different tradable instruments. For instance, a particular market maker 12b may be categorized as a first-level market maker for instrument(s) for which that market maker 12b is a strong trader and as a second-level market maker 12b for other types of instruments.

Terminals 14 may be communicatively coupled with order price feed modules 16. An order price feed module 16 comprises any suitable hardware and/or software for generating and/or communicating one or more order price feeds 26. In some embodiments, order price feed module 16 may be separate from terminal 14 and interface server 15. In other embodiments, order price feed module 16 may be comprised within terminal 14 or interface server 15. Thus, the functions and operations of order price feed module 16 may, in some embodiments, be performed by terminal 14, interface server 15, or any other suitable component of trading system 10. An order price feed 26 may be a real time (or substantially real time) data stream indicating the current best bid and/or offer that trader 12 is willing to send or make available for a particular trading product. Order price feed 26 for a particular trading product may comprise an offer quantity, an offer price, a bid quantity, and/or a bid price. A particular market maker 12b may supply order price feed 26 (e.g., bid-offer spreads) for a particular trading product to multiple market centers 40 and/or trading platforms 18 to allow that market maker 12b to flood the general marketplace with its best bid and offer price. According to certain embodiments, market maker 12b generates revenue by persistently trading at its bid and offer prices and profiting the difference. Such a strategy may be referred to as "trading the bid-offer spread."

Terminals 14 and/or order price feed modules 16 may be communicatively coupled to trading platform 18 via network 20. Network 20 is a communication platform operable to exchange data or information between terminals 14 and trading platform 18 and/or market centers 40. In some embodiments, network 20 may represent an Internet architecture that enables terminals 14 to communicate with platform 18 and/or market centers 40. In other embodiments, network 20 may be a plain old telephone system (POTS), which traders 12 could use to perform the same operations or functions. In some embodiments, network 20 may be any packet data network (PDN) offering a communications interface or exchange between any two nodes in system 10. Network 20 may further comprise any combination of the above examples and any local area network (LAN), metropolitan area network (MAN), wide area network (WAN), wireless local area network (WLAN), virtual private network (VPN), intranet, or any other appropriate architecture or system that facilitates communications between terminals 14 and platform 18 and/or market centers 40.

Market centers 40 comprise all manner of order execution venues including exchanges, Electronic Communication Networks (ECNs), Alternative Trading Systems (ATSs), market makers, or any other suitable market participants. Each market center 40 maintains a bid and offer price in a given trading product by standing ready, willing, and able to buy or sell at publicly quoted prices, also referred to as market center prices. A particular market center 40 may facilitate trading of multiple trading products, such as, for example, stocks, fixed income securities, futures contracts, currencies, precious metals, and so forth. Market centers may be communicatively coupled to trading platform 18 via network 20.

Trading platform 18 is a trading architecture that facilitates the routing, matching, and otherwise processing of trading orders 24 and/or order price feeds 26. Trading platform 18 may comprise a management center or a headquartering office for any person, business, or entity that seeks to route, match, process, or fill trading orders 24 and/or order price feeds 26. Accordingly, trading platform 18 may include any suitable combination of hardware, software, personnel, devices, components, elements, or objects that may be utilized or implemented to achieve the operations and functions of an administrative body or a supervising entity that manages or administers a trading environment. Trading platform 18 may comprise a processor 32 and a memory 34.

Processor 32 is operable to process trading orders 24, record trading orders 24 in memory 34 and route trading orders 24 to traders 12 and/or market centers 40. Processor 32 is further operable to execute rules 36 stored in memory 34 to generate and use trader lists 44 to manage the disclosure of trading orders 24 and/or order price feeds 26 between traders 12. Processor 32 may comprise any suitable combination of hardware and software implemented in one or more modules to provide the described function or operation.

Memory 34 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 24. Although FIG. 1 illustrates memory 34 as internal to trading platform 18, it should be understood that memory 34 may be internal or external to components of trading system 10, depending on particular implementations. Also, memory 34 illustrated in FIG. 1 may be separate or integral to other memory devices to achieve any suitable arrangement of memory devices for use in trading system 10.

According to certain embodiments, memory 34 comprises rules 36 and trader profiles 38. Generally, rules 36 comprises software instructions for routing, matching, processing, or filling trading orders 24. In particular, rules 36 may comprise instructions for generating and using trader lists 44 to manage the disclosure of trading orders 24 and/or order price feeds 26 between traders 12 and/or market centers 40.

Trader profiles 38 generally comprise information regarding the identity, address, employer, and/or account information of traders 12. In some embodiments, each trader 12 in trading system 10 is associated with a respective trader profile 38. Trader profile 38 may comprise trader preferences 42 and trader lists 44 of a particular trader 12. Trader profile 38 may further comprise other relevant information such as, for example, activity logs, trade data, and history data associated with trader 12. Trading platform 18 may allow a person or entity to register to use trading system 10 as a trader 12. When a particular trader 12 registers to use trading system 10, trading platform 18 may generate trader profile 38 for that trader 12. Thus, for each trader 12 in trading system 10, memory 34 may store a corresponding trader profile 38.

It should be understood that the internal structure of trading platform 18 and the interfaces, processors, and memory devices associated therewith is malleable and can be readily changed, modified, rearranged, or reconfigured to achieve the intended operations of trading platform 18.

In operation, trading platform 18 may use trader lists 44 to minimize the risk of a particular trader 12 trading with other traders 12 with whom the particular trader 12 does not want to trade. For example, a particular trader 12 may perceive that trades with highly specialized traders 12 are not likely to be profitable. Based on this perception, the particular trader 12 may configure trader list 44 to designate those highly specialized traders 12 with which the particular trader 12 does not want to trade. When trading platform 18 receives trading order 24 from a particular trader 12, trading platform 18 may scan trader profile 38 associated with trader 12 to identify the particular trader list 44 associated with trader 12. Trader list 44 may designate one or more traders 12 in trading system 10. Trading platform 18 may then transmit trading order 24 to traders 12 in trading system 10 with the exception of those traders 12 designated by trader list 44. Trading platform 18 may affirmatively prevent the transmission of trading order 24 to those particular traders 12 designated by trader list 44. Thus, because trading platform 18 uses trader list 44, a particular trader 12 may avoid trades between the particular trader 12 and those traders 12 designated by trader list 24.

According to certain embodiments, trading platform 18 may allow persons or entities to register to use trading system 10 as traders 12. When trader 12 registers to use trading system 10, trading platform 18 may request and receive from trader 12 information regarding the trader preferences 42, account, identity, affiliation, size, trading history, and/or other suitable attributes of trader 12. Based on this information provided by trader 12, trading platform 18 may generate trader profile 38 for trader 12. Trading platform 18 may store trader preferences 42 of trader 12 in trader profile 38.

In some embodiments, trading platform 18 may allow a particular trader 12 to create trader list 44 that designates one or more traders 12 with whom the particular trader 12 does not want to trade. Trader 12 may generate multiple trader lists 44. For example, a particular trader 12 may generate one trader list 44 for one type of trading product and another trader list 44 for another type of trading product. Each of trader lists 44 associated with a particular trader 12 may be the same or different. Trading platform 18 may store trader lists 44 of a particular trader 12 in trader profile 38 of that trader 12. Trading platform 18 may allow trader 12 to create trader lists 44 when trader 12 registers to use trading system 10. Once trader 12 creates trader lists 44, trader 12 may thereafter update, modify, and/or change trader lists 44 to reflect changes in the market and/or in the trading strategies.

In some embodiments, for a particular trader 12, trading platform 18 may create all or a portion of trader lists 44 automatically based on trader preferences 42 of that trader 12. Trading platform 18 may generate trader list 44 for a particular trader 12 by comparing trader preferences 42 of the particular trader 12 with trader profiles 38 of the other traders 12 in trading system 10. For example, trader 12 may submit to trading platform 18 a particular trader preference 42 to avoid trading ten-year notes with traders 12 whose trade volume for ten-year notes exceeded $500,000,000 during the last 7 days. Trading platform 18 may store this particular trader preference 42 in trader profile 38 associated with trader 12. In this example, trading platform 18 may then scan trader profiles 38 of the other traders 12 to identify those traders 12 in trading system 10 whose trade volume for ten-year notes exceeded $500,000,000 during the last 7 days. Trading platform 18 may generate trader list 44 designating the identified traders 12 and may store the generated trader list 44 in trader profile 38. In the present example, trading platform 18 may update trader list 44 at the end of each day, each week, or other configurable period such that trader list 44 may be based on recent trading activity (i.e., the trading of ten-year notes during the most recent 7 days).

The foregoing example illustrates trader preference 42 based on a particular characteristic of counterparty traders 12 (i.e., trading volume that exceeded a particular threshold ($500,000,00) of a particular trading product (ten-year notes)). It should be understood, however, that trader preference 42 may be based on any number and combination of characteristics associated with counterparty traders 12. For example, trader preference 42 may be associated with a particular trading product and trader list 44 may designate those traders 12 that specialize in trading the particular trading product. As another example, trader preference 42 may be associated with a particular trading activity and trader list 44 may designate those traders 12 that engage in the particular trading activity. Thus, it should be understood that a particular trader preference 42 may be based on the size, affiliation, trading history, identity, specialty, and/or any other suitable characteristic of counterparty traders 12.

Once trading platform 18 receives from a particular trader 12 trading order 24, trading platform 18 may determine whether trader profile 38 associated with the particular trader 12 includes a trader list 44. If trader profile 38 includes a trader list 44, trading platform 18 may transmit trading order 24 to traders 12 in trading system 10 with the exception of those traders 12 designated by the trader list 44. Trading platform 18 may prevent the transmission of trading order 24 to those traders 12 designated by the trader list 44. Transmitting trading order 24 to traders 12 may comprise disclosing, displaying, and/or otherwise communicating trading order 24 to traders 12. Preventing the transmission of trading order 24 may comprise deleting trading order 24 from one or more queues associated with those traders 12 designated by trader list 44, filtering trading order 24 from one or more data streams associated with traders 12 designated by trader list 44, and/or routing trading order 24 away from those traders 12 designated by trader list 44.

It should be understood that, just as trading platform 18 may use trader list 44 to filter the transmission of trading order 24, trading platform 18 may use trader list 44 to filter the transmission of order price feed 26. In particular, when trader 12 submits order price feed 26, trading platform 18 may use trader list 44 associated with trader 12 to prevent the transmission of order price feed 26 to those traders 12 designated by trader list 44. Trading platform 18 may thereby prevent traders 12 that are designated by trader list 44 associated with a particular trader 12 from aggressing against order price feed 26 associated with the particular trader 12.

In some embodiments, trading platform 18 may transmit to a particular trader 12 trading orders 24 from those traders 12 designated by trader list 44 associated with particular trader 12. Thus, although the designated traders 12 may not receive trading orders 24 from the particular trader 12 associated with trader list 44, the particular trader 12 may receive trading orders 24 from the designated traders 12. In some embodiments, trading platform 18 may cause terminal 14 to display trading order 24 from a designated trader 12 as dimmed or highlighted relative to the display of a particular trading order 24 submitted by a particular trader 12 that is not designated by trader list 44. For example, a particular trader A is associated with trader list 44 that designates traders B and D. In this example, trading system 10 comprises traders A, B, C, D, and E. If trader A submits trading order 24a, then trading platform 18 may transmit trading order 24a to traders C and E but, based on trader list 44, prevent the transmission of trading order 24a to traders B and D. In this example, if trader B submits trading order 24b and if trader C submits trading order 24c, then trading platform 18 may transmit trading order 24b and trading order 24c to terminal 14 associated with trader A. Because trader B is designated by trader list 44 associated with trader A, trading platform 18 may cause terminal 14 associated with trader A to display trading order 24b as dimmed or highlighted relative to trading order 24c. Although the foregoing example illustrates trader list 44 as designating two traders (i.e., traders B and D), it should be understood that trader list 44 may designate any number and combination of traders 12 based on any number and combination of suitable criteria.

In the foregoing example, based on trader list 44, trading platform 18 prevents the transmission and/or disclosure of a particular trading order 24 to particular traders 12. It should be understood, however, that the function of preventing the transmission and/or disclosure of particular trading orders 24 and/or order price feeds 26 may be performed by interface server 15, by trading platform 18, or by interface server 15 and trading platform 18 in conjunction. For example, interface server 15 may comprise all or a portion of an application program interface (API) associated with trading platform 18. In some embodiments, interface server 15 associated with a particular trader 12 may store trader profiles 38 (including trader preferences 42 and trader lists 44). Based at least in part on trader list 44, interface server 15 may prevent the disclosure of one or more trading orders 24 and/or order price feeds 26 to one or more traders 12. Thus, in some embodiments, the function of preventing the disclosure of trading order 24 to a particular trader 12 may be performed at least in part by one or more interface servers 15.

According to certain embodiments, the use of trader lists 44 to process trading orders 24 may offer various advantages. It should be noted that one or more embodiments may benefit from some, none, or all of the advantages discussed below. One advantage is that, by using trader lists 44, trading platform 18 assists traders 12 in managing risks associated with trading. For example, a particular trader 12 may perceive that trades with highly specialized traders 12 are not likely to be profitable. Based on this perception, the particular trader 12 may configure trader list 44 to designate those highly specialized traders 12 with which the particular trader 12 does not want to trade. When the particular trader 12 submits trading order 24 and/or order price feed 26, trading platform 18 may transmit trading order 24 and/or order price feed 26 to traders 12 in trading system 10 with the exception of those traders 12 designated by trader list 44. Thus, trading platform 18 may prevent trades that the particular trader 12 believes would be unprofitable.

Another advantage is that, by using trader lists 44, trading platform 18 may limit or eliminate small trades that are perceived as nuisances. For example, a particular trader 12 may submit as trading order 24 an offer to trade a large quantity of a particular trading product. In a system without trader list 44, small traders 12 may receive trading order 24 and attempt to aggress against relatively small portions of the total quantity of trading order 24. The particular trader 12 that submitted trading order 24 may perceive such a small transaction as a nuisance. To eliminate this nuisance, the particular trader 12 may configure trader list 44 to designate those traders 12 in trading system 10 that are prone to aggress only small portions of a large bid or offer. Thus, when the particular trader 12 submits trader order 24, trading platform 18 may transmit trading order 24 to traders 12 in trading system 10 with the exception of those small traders 12 designated by trader list 44. Thus, trading platform 18 may reduce the occurrence of nuisance-type trades. Thus, by allowing traders 12 to configure trader lists 44, trading platform 18 may assist traders 12 in managing risks and in avoiding nuisance-type trades.

Figure 2B:
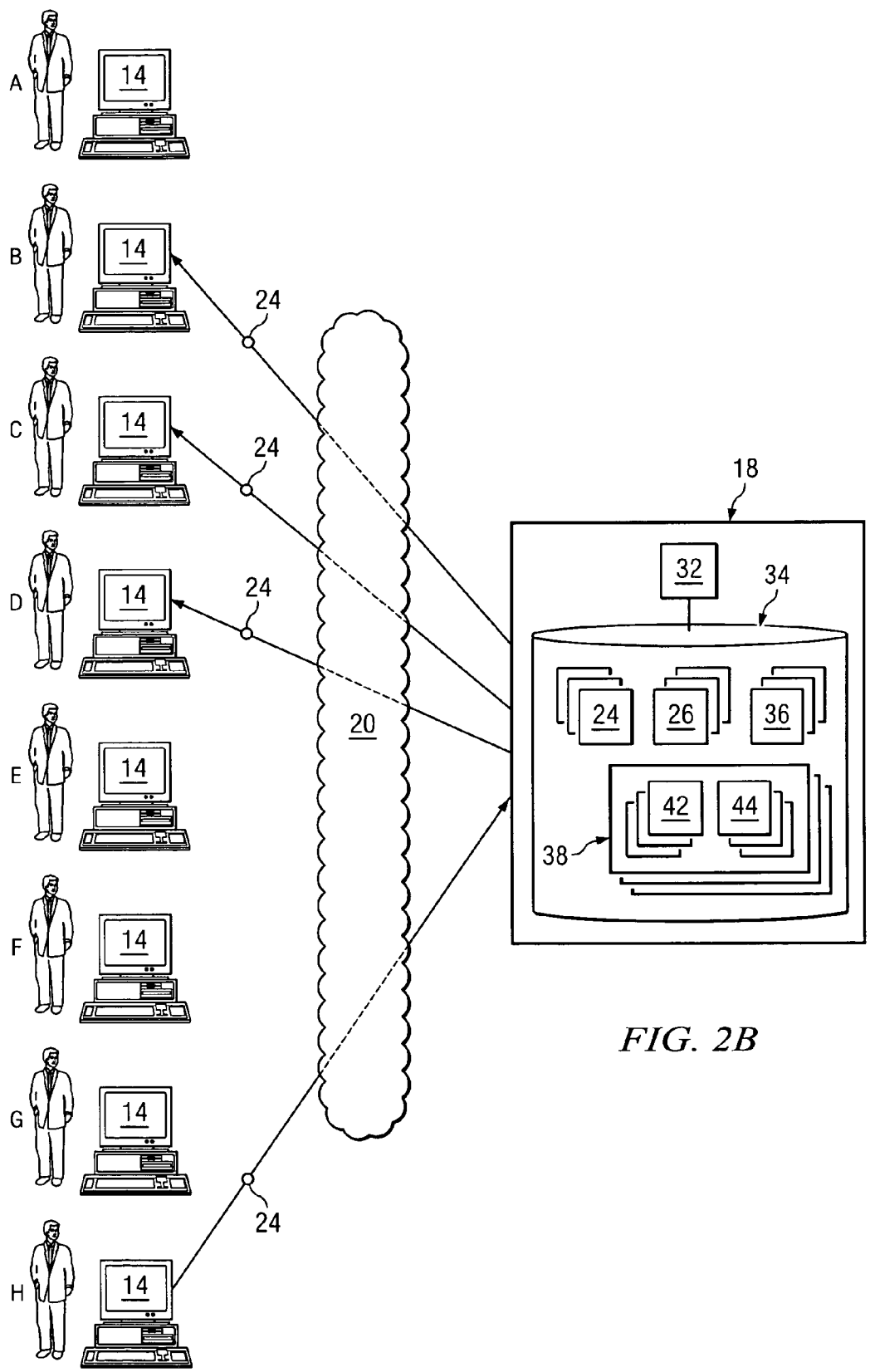
FIG. 2B illustrates an example of a flow of operation between traders and a trading platform, according to certain embodiments of the present invention.

FIGS. 2A and 2B provide an example of using trader list 44 to prevent trades between a particular trader 12 and other traders 12 with whom the particular trader 12 does not want to trade. In particular, FIG. 2A illustrates trader profile 38 associated with a particular trader 12. In this example, the particular trader 12 is referred to as Trader H. Trader H submits to trading platform 18 trader preferences 42a, 42b, and 42c. Trader preference 42a is to avoid executing trades for ten-year notes with traders 12 whose trade volume for ten-year notes exceeded $500,000,000 during the past seven days. Trader preference 42b is to avoid executing trades for Euros where the trade value would be less than $50,000. Trader preference 42c is to avoid executing trades for stock A with traders 12 that are not associated with an order price 26 feed for Japanese Yen. Trading platform 18 stores trader preferences 42a, 42b, and 42c in trader profile 38 associated with Trader H.

In the present example, trading platform 18 used trader preferences 42 in trader profile 38 to automatically generate trader lists 44 for Trader H. Because trader preference 42a relates to ten-year notes, trading platform 18 generates trader list 44a associated with ten-year notes. In particular, trading platform 18 scans trader profiles 38 to identify traders 12 in trading system 10 whose trade volume for ten-year notes during the past seven days exceeds $500,000,000. In the present example, trading platform 18 determines that, during the past seven days, the trade volumes for ten-year notes for each of Traders A, E, F, and G exceeded $500,000,000. Accordingly, trading platform 18 configures trader list 44a to designate Traders A, E, F, and G.

Because trader preference 42b relates to Euros, trading platform 18 generates trader list 44b associated with Euros. In particular, trading platform 18 scans trader profiles 38 to identify those traders 12 in trading system 10 that tend to initiate trades for Euros where the trade value is less than $50,000. In the present example, trading platform 18 determines that Traders B and D tend to initiate such trades. Accordingly, trading platform 18 configures trader list 44b to designate Traders B and D.

Because trader preference 42c relates to stock A, trading platform 18 generates trader list 44c associated with stock A. Based on trader preference 42c, trading platform 18 scans trader profiles 38 to identify those traders 12 that are not associated with an order price feed 26 for Japanese Yen. In the present example, trading platform 18 determines that Traders C, E, and D are not associated with an order price feed 26 for Japanese Yen. Accordingly, trading platform 18 configures trader list 44c to designate Traders C, E, and D. Thus, Trader H is associated with three trader lists 44 and each trader list 44 is associated with a different trading product. As illustrated in the present example, trading platform 18 may automatically generate and/or configure trader lists 44 based on trader preferences 42 stored in trader profile 38 of a particular trader 12.

FIG. 2B illustrates one embodiment of a flow of operation between traders 12 and trading platform 18 according to the example trader profile 38 illustrated in FIG. 2A. In this example, trading system 10 comprises eight traders 12—namely, Traders A-H. In the present example, Trader H submits to trading platform 18 trading order 24 for ten-year notes. Upon receiving trader order 24, trading platform 18 determines that trader profile 38 associated with Trader H comprises trader list 44a associated with ten-year notes. In particular, trading platform 18 determines that trader list 44a designates Traders A, E, F, and G. Trading platform 18 transmits trading order 24 to Traders B, C, and D. Based on trader list 44a, however, trading platform 18 prevents the transmission of trading order 24 to Traders A, E, F, and G. Thus, trading platform 18 allows Trader H to avoid trades for ten-year notes with those traders 12 in trading system 10 with whom Trader H does not want to trade.

Figure 2C:
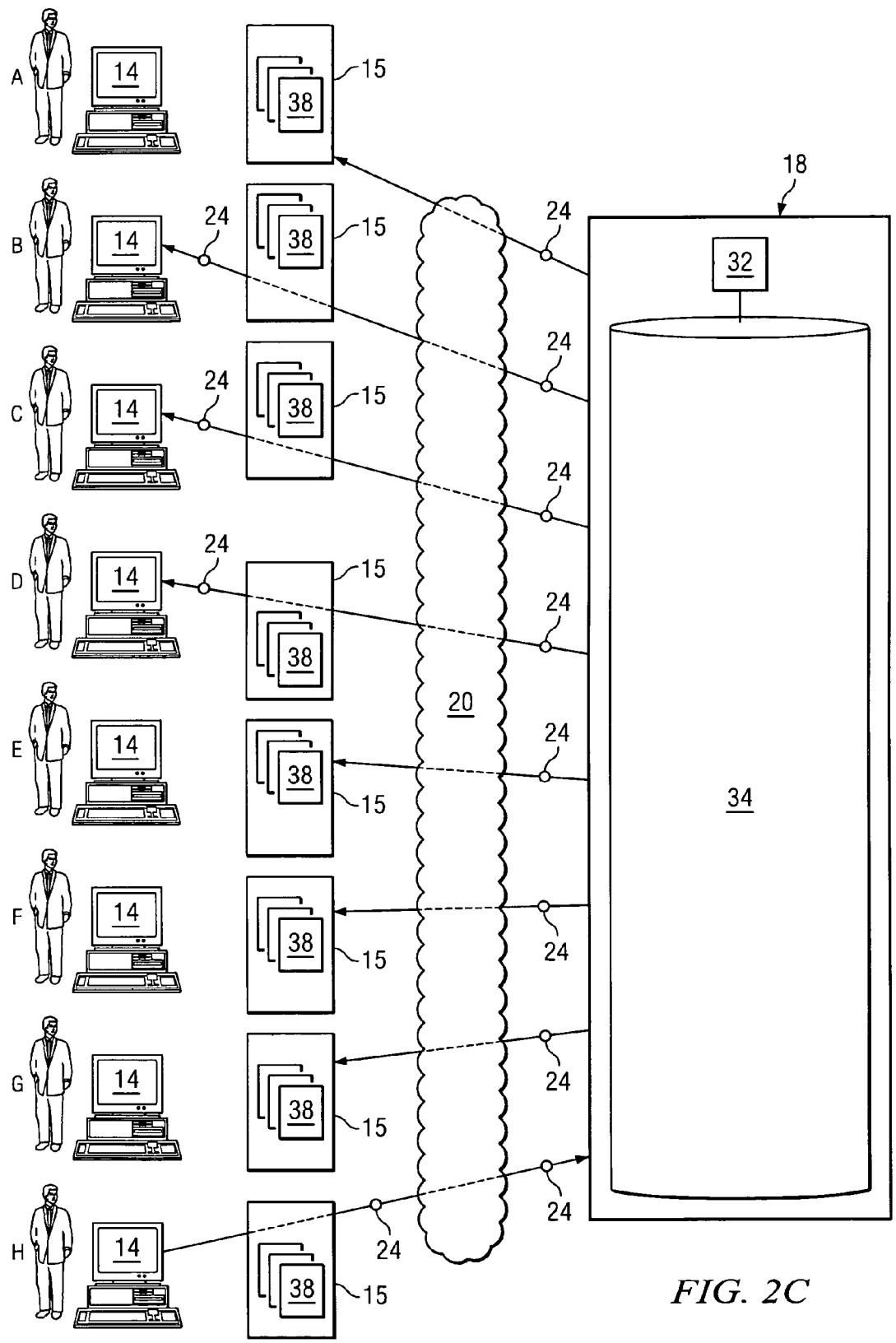
FIG. 2C illustrates an example of a flow of operation between traders and a trading platform, according to certain embodiments of the present invention.

FIG. 2C illustrates another embodiment of a flow of operation between traders 12 and trading platform 18 according to the example trader profile 38 illustrated in FIG. 2A. In this example, trading system 10 comprises eight traders 12—namely, Traders A-H. Each trader 12 is associated with a respective interface server 15. In this example, each interface server 15 stores one or more trader profiles 38. Trader profiles 38 comprise trader preferences 42 and trader lists 44 (not shown). In this example, the function of preventing the disclosure of particular trading orders 24 to particular traders 12 is performed at least in part by interface servers 15. In particular, trader H submits trading order 24 to trading platform 18. Upon receiving trading order 24, trading platform 18 transmits trading order 24 to interface servers 15 associated with Traders A-G respectively. In this example, interface servers 15 associated with Traders A-G each comprise trader profile 38 associated with Trader H (as illustrated in FIG. 2A). Trader profile 38 associated with Trader H comprises trader list 44a designating traders A, E, F, and G. In this example, based on trader list 44a, interface servers 15 associated with Traders B, C, and D transmit trading order 24 to terminals 14 associated with Traders B, C, and D, respectively. Based on trader list 44a, interface servers 15 associated with Traders A, E, F, and G, respectively, do not transmit trading order 24 to terminals 14 associated with Traders A, E, F, and G, respectively. Interface servers 15 associated with Traders A, E, F, and G may prevent the transmission of trader order 24 of Trader H by filtering that trading order 24 out of data transmissions from trading platform 18. Thus, in some embodiments, a particular interface server 15 may comprise one or more trader profiles 38 and may filter or prevent the transmission of particular trading orders 24.

Although the foregoing example illustrates trader preferences 42 and trader lists 44 associated with ten-year notes, Euros, and a particular stock, it should be understood that trader preferences 42 and trader lists 44 may be based on any number and combination of trading products, market data, profile data, trading system information, and/or other suitable criteria. In the foregoing example, trading platform 18 automatically generates trader lists 44 based on trader preferences 42 associated with trader 12. It should be understood that, in some embodiments, trader 12 may configure trader lists 44 by manually selecting the particular traders 12 to be in trader lists 44.

FIG. 3 illustrates a flowchart for generating and using trader lists 44 to process trading orders 24. The method begins at step 302 when trading platform 18 receives one or more trader preferences 42 from a particular trader 12. Trader 12 may submit trader preferences 42 at the time of registering to use trading system 10, and trading platform 18 may use trader preferences 42 to generate trader profile 38 associated with trader 12. In some embodiments, after trader 12 registers and submits the initial trader preferences 42, trading platform 18 may allow trader 12 to later modify, delete, and/or add to trader preferences 42. At step 304, trading platform 18 compares trader preferences 42 of the particular trader 12 with trader profiles 38 of the other traders 12 in trading system 10. For example, if a first trader 12 submits trader preference 42 to avoid trading with traders 12 having a particular characteristic, trading platform 18 may compare the trader preference 42 (e.g., the particular characteristic) with trader profiles 38 to identify those traders 12 having the particular characteristic.

At step 306, based at least in part on the comparison, trading platform 18 generates one or more trader lists 44 designating one or more traders 12. Trading platform 18 may store trader lists 44 in trader profile 38 associated with trader 12. In some embodiments, trader 12 may be associated with a plurality of trader lists 44 and each of the plurality of trader lists 44 may be associated with a respective trading product. At step 308, trading platform 18 receives trading order 24 from trader 12. Trading platform 18 identifies, at step 310, the one or more traders 12 designated by the appropriate trader list 44 based on, for example, the trading product associated with the trading order 24. At step 312, trading platform 18 transmits trading order 24 to traders 12 in trading system 10 with the exception of the one or more traders 12 designated by trader list 44 identified at step 310. At step 314, trading platform 18 prevents the transmission of trading order 24 to the one or more traders 12 designated by trader list 44. Preventing the transmission of trading order 24 may comprise deleting trading order 24 from one or more queues associated with traders 12 designated by trader list 44, filtering trading order 24 from one or more data streams associated with traders 12 designated by trader list 44, and/or routing trading order 24 away from traders 12 designated by trader list 44.

Figure 4:
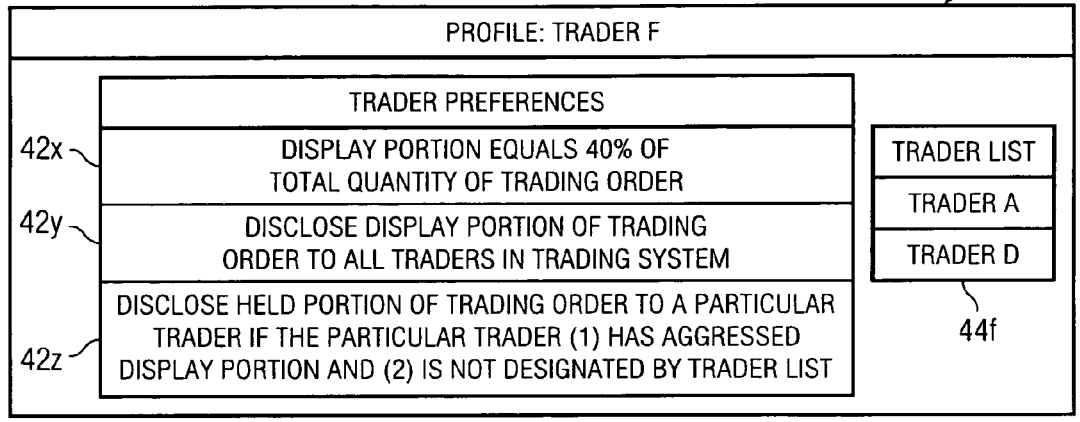
FIG. 4 illustrates an example of a trader profile configured for dividing a trading order into a display portion and a held portion, according to certain embodiments of the present invention.

FIG. 4 illustrates a particular trader profile 38 that is configured to use trader lists 44 for the partial disclosure of a trading order 24. In some embodiments, trading platform 18 may configure trading order 24 to comprise two parts—a display portion and a held portion. Trading platform 18 may be configured to transmit the display portion of trading order 24 to other traders 12 and to withhold from transmission the held portion of trading order 24 until one or more configurable conditions are satisfied. Once the one or more configurable conditions associated with the held portion of trading order 24 are satisfied, trading platform 18 may transmit and/or disclose the held portion of trading order 24 to one or more traders 12 in trading system 10.

In some embodiments, trading platform 18 may determine the display portion and the held portion of trading order 24 based at least in part on trader preferences 42 associated with trader 12. Trader 12 may submit to trading platform 18 a particular trader preference 42 to determine the display portion and/or the held portion of a particular trading order 24 based on current market data, based on a configurable percentage of the total quantity of trading order 24, based on a configurable threshold, and/or any number and combination of suitable criteria.

In some embodiments, trading platform 18 may be configured to transmit the display portion of trading order 24 from a particular trader 12 to all other traders 12 in trading system 10. Once the display portion of trading order 24 has been aggressed by one or more traders 12, trading platform 18 may transmit the held portion of trading order 24 to one or more traders 12 that are not designated by trader list 44 associated with the particular trader 12. In some embodiments, trading platform 18 may prevent the transmission of the held portion of trading order 24 to those traders 12 designated by trader list 44 associated with trader 12. Thus, trading platform 18 may be configured to transmit the display portion of trading order 24 to all other traders 12 in trading system 10 and to limit the transmission of the held portion of trading order 24 to those traders 12 that are not designated by trader list 44.

FIG. 4 illustrates an example trader profile 38 for Trader F. In this example, trader profile 38 may be used to divide trading order 24 into a display portion and a held portion. Trader profile 38 comprises three trader preferences (42x, 42y, and 42z) that are related to trading Euros. In particular, trader preference 42x is to configure the display portion of trading order 24 to be equal to 40% of the total quantity of trading order 24. Trader preference 42y is to transmit the display portion of trading order 24 from Trader F to all other traders 12 in trading system 10. In the present example, trading system 10 comprises Traders A-H. Trader preference 42z is to transmit the held portion of trading order 24 to a particular trader 12 if (1) that particular trader 12 has aggressed at least a portion of the display portion of trading order 12 and (2) that particular trader 12 is not designated by trader list 44 associated with Trader F. In addition to comprising trader preferences 42, trader profile 38 associated with Trader F comprises trader list 44f. Trader list 44f relates to trading Euros and designates Traders A and D.

In the present example, Trader F submits to trading platform 18 trading order 12 for a total quantity of 20,000,000 Euros. Based on trader preference 42x in trader profile 38, trading platform 18 determines that the display portion of trading order 24 is 8,000,000 Euros (i.e., 40% of the total quantity) and that the held portion of trading order 24 is 12,000,000 Euros (i.e., 60% of the total quantity). Based on trader preference 42y, trading platform 18 transmits the display portion of trading order 24 (i.e., 8,000,000 Euros) to Traders A, B, C, D, E, G, and H. Subsequently, Trader C aggresses the entire display portion of trading order 24. As a result, trading platform 18 determines whether the configurable condition of trader preference 42z has been satisfied. In this example, trading platform 18 determines that Trader C aggressed the display portion of trading order 24 and that Trader C is not designated by trader list 44f. As a result, trading platform 18 transmits and/or discloses to Trader C the held portion (i.e., the remaining 12,000,000 Euros) of trading order 24. Thus, without disclosing the held portion of trading order 24 to at least those traders 12 designated by trader list 44, trading platform 18 provides Trader C with an opportunity to aggress against the held portion of trading order 24.

The foregoing example illustrates using a configurable percentage of the total quantity of trading order 24 to determine the display portion of trading order 24. It should be understood, however, that trading platform 18 may determine the display portion of trading order 24 based on any suitable data, tiers, threshold, and/or other suitable information. Although trading order 24 in the foregoing example relates to trading Euros, it should be understood that the method and system described herein may be applied to trading orders 24 for any number and combination of suitable trading products.

In the foregoing example, the configurable condition for transmitting the held portion of trading order 24 is based on whether a particular trader 12 has aggressed all or a portion of the display portion of trading order 24. It should be understood, however, that the transmission of the held portion of trading order 24 may be triggered based on any number and combination of suitable conditions. For example, the transmission of the held portion of trading order 24 may be based on whether the market has crossed, whether the best bid or offer price in trading system 10 has satisfied a configurable threshold, whether the current trading activity in trading system 10 has satisfied a particular threshold, and/or any other suitable condition.

In some embodiments, just as trading platform 18 may divide trading order 24 into a display portion and a held portion, trading platform 18 may be configured to divide a particular order price feed 26 into a display portion and a held portion. The transmission of the held portion of order price feed 26 to other traders 12 may be triggered by any number and combination of configurable conditions. In some embodiments, trading platform 18 may distribute the display portion of trading order 24 and/or order price feed 26 among multiple price levels.

An example illustrates certain embodiments. Trader 12m submits order price feed 26 for currency A to trading platform 18. The total quantity of order price feed 26 is 100,000,000 units of currency A. The best bid price associated with order price feed 26 is $2.00 per unit and the best offer price associated with order price feed 26 is $2.20 per share. Trader preferences 42 stored in trader profile 38 associated with trader 12m indicate that the display portion of order price feed 26 should be 70,000,000 units of currency A. Trader preferences 42 associated with trader 12m also indicate that the held portion of order price feed 26 should be disclosed if the market crosses. In this example, trader profile 38 comprises trader list 44 that is associated with currency A and that designates trader 12p and trader 12q. Accordingly, trading platform 18 discloses to the other traders 12 in trading system 10 (except trader 12p and trader 12q) a quantity of 70,000,000 units of currency A with a best bid price of $2.00 per unit and a best offer price of $2.20 per unit. Subsequently, the market for currency A crosses. Consequently, trading platform 18 discloses the held portion of order price feed 26b—the remaining 30,000,000 units—to the other traders 12 in trading system 10 (except for trader 12p and trader 12q).

In the foregoing example, trader preferences 42 directed trading platform 18 to set the display portion of order price feed 26 to be equal to a configurable level—70,000,000 units. In some embodiments, trader preferences 42 may direct trading platform 18 to determine the display portion of order price feed 26 based on a configurable percentage of the total quantity associated with order price feed 26, based on current market data, or based on any number and combination of suitable criteria. In some embodiments, trading platform 18 may distribute the display portion and/or held portion of order price feed 26 among multiple price levels. For instance, referring to the foregoing example, trader preferences 42 may indicate that half of the display portion of order price feed 26 should be disclosed at a bid price of $2.00 per unit and the other half at a bid price of $2.10.

Although the foregoing examples use certain quantities, percentages, and currency amounts to illustrate certain embodiments of the present invention, it will be understood that any quantities, percentages, currency amounts, or other suitable metrics may be used without changing the operation or functionality of the present invention.

The embodiments described herein offer important technical advantages. Various embodiments may have none, some, or all of these advantages. One advantage is that trading system 10 protects traders 12 against latency. In particular, trading system 10 may take a small amount of time to process trading orders 24 and/or order price feeds 26 from traders 12. Markets, however, may experience rapid changes in prices. If a market shifts immediately after trader 12 submits trading order 24 and/or order price feed 26, that trader 12 may be exposed to trades at an undesirable price. By allowing trader 12 to initially disclose less than all of trading order 24 and/or order price feed 26 to other traders 12, the present invention protects trader 12 against latency and shifts in the market.

Another advantage is that trading platform 18 is operable to use trader lists 44 associated with a particular trader 12 to avoid trades between the particular trader 12 and other traders 12 with whom the particular trader 12 does not want to trade. In some embodiments, traders 12 may use trader lists 44 to avoid nuisance-type trades and/or trades that are not likely to be profitable. Thus, trader lists 44 assist traders 12 in managing risks associated with trading.

In some embodiments, trading platform 18 may configure order price feed 26 from a particular trader 12 to be an aggressive order price feed 26. Similarly, trading platform 18 may configure trading order 24 from a particular trader 12 to be an aggressive trading order 24. In particular, trading platform 18 may receive trading orders 24 from traders 12 and hold those trading orders 24 until one or more configurable conditions occur in trading system 10. For example, trader 12 may submit trader preference 42 that the best bid or offer price of a particular trading product must reach a configurable level before trading platform 18 may disclose trading order 24 or use trading order 24 to aggress one or more contra trading orders 24.

As an example, Trader 12w submits trading order 24 to purchase 1,000,000 shares of stock A to trading platform 18. In addition, Trader 12w submits trader preference 42 to not disclose trading order 24 until the price per share for stock A in the market reaches $50.00, and then to submit trading order 24 as an aggressive trading order 24. In this example, trading platform 18 stores trading order 24 and trader preference 42 in memory 34. Subsequently, trading platform 18 detects that the price per share for stock A has reached $50.00. As a result, trading platform 18 submits trading order 24 of Trader 12w to aggress against the available volume of stock A in trading system 10. Thus, trading platform 18 may allow trader 12 to submit configurable conditions that must occur before trading platform 18 discloses trading order 24 and/or uses trading order 24 to aggress a contra trading order 24. Trading platform 18 may thereby increase the likelihood that a particular trading order 24 and/or order price feed 26 from a particular trader 12 will not be disclosed to other traders 12 until conditions desired by the particular trader 12 are present in the market.

In some embodiments, trading platform 18 may use trader lists 44 to process aggressive order price feeds 26 and/or aggressive trading orders 24. For example, upon receiving an aggressive order price feed 26 from a first trader 12, trading platform 18 may determine that the first trader 12 is associated with a particular trader list 44. In this example, the particular trader list 44 designates a third trader 12 but not a second trader 12. Based on the particular trader list 44, trading platform may use the aggressive order price feed 26 to aggress against one or more trading orders from the second trader 12. However, because the particular trader list 44 designates the third trader 12, trading platform 18 may prevent the aggressive order price feed 26 from aggressing against trading orders 24 from the third trader 12. Thus, trading platform 18 may use trader lists 44 to process aggressive order price feeds 26 and/or aggressive trading orders 24.

Figure 5:
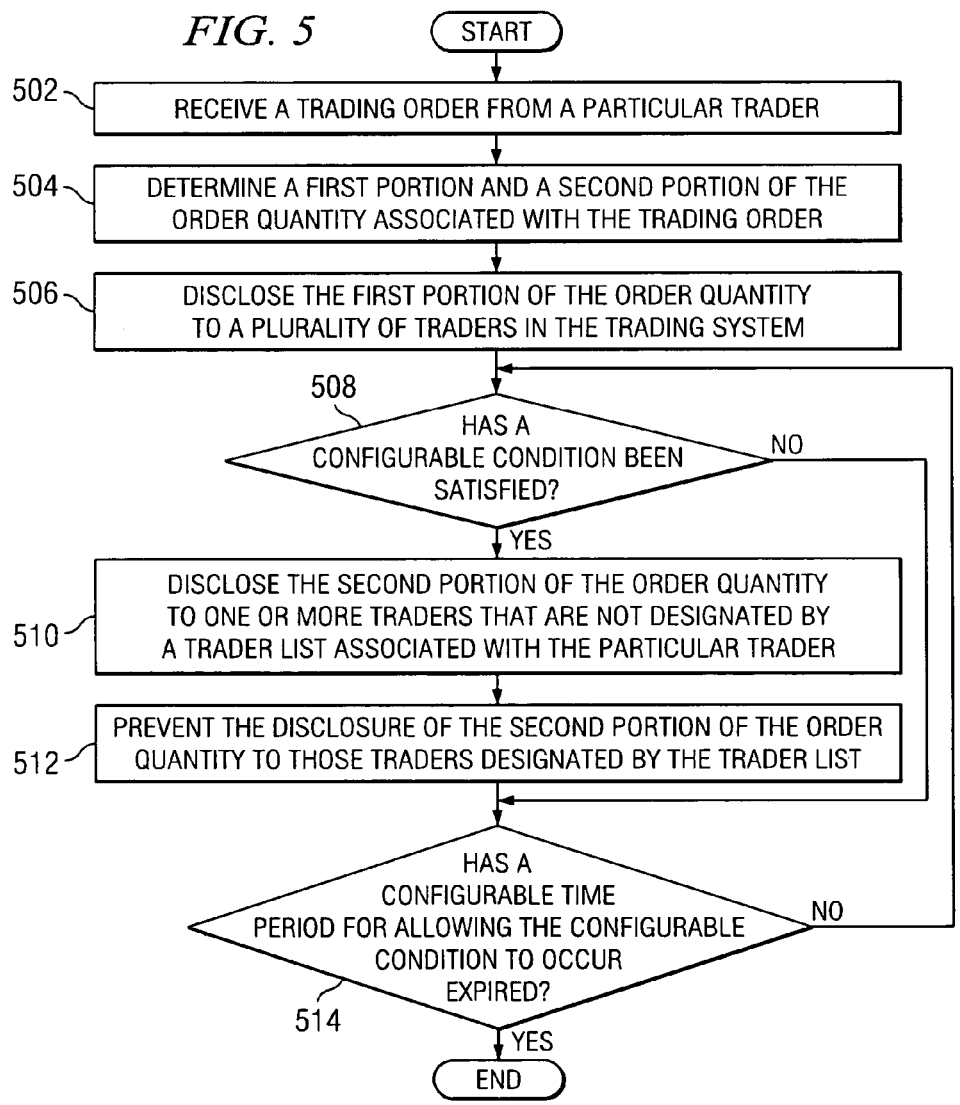
FIG. 5 illustrates a flowchart for processing a display portion and a held portion of a trading order, according to certain embodiments of the present invention.

FIG. 5 illustrates a flow chart for processing the display portion and the held portion of a particular trading order 24, according to certain embodiments. The method starts at step 502 when trading platform 18 receives trading order 24 from a particular trader 12. In some embodiments, trading order 24 may be associated with a total quantity of a particular trading product. The particular trader 12 may be associated with a trader list 44 designating one or more traders 12.

At step 504, trading platform 18 determines a first portion and a second portion of the order quantity associated with trading order 24. The determination of the first portion and the second portion may be based at least in part on one or more trader preferences 42 associated with the particular trader 12. At step 506, trading platform 18 discloses the first portion of the order quantity to a plurality of traders 12 in trading system 10. At step 508, trading platform 18 determines whether a configurable condition has been satisfied. The configurable condition may be based on one or more trader preferences 42 associated with the particular trader 12. If trading platform 18 determines at step 508 that the configurable condition has been satisfied, then at step 510, trading platform 18 discloses the second portion of the order quantity to one or more traders 12 that are not designated by trader list 44 associated with the particular trader 12. At step 512, trading platform 18 prevents the disclosure of the second portion of the order quantity to those traders 12 designated by trader list 44.

If, at step 508, trading platform 18 determines that the configurable condition has not been satisfied, then trading platform 18 determines at step 514 whether a configurable time period (e.g., for allowing the configurable condition to occur) has expired. If trading platform 18 determines at step 514 that the configurable time period has not expired, trading platform 18 may return to step 508. If, however, trading platform 18 determines at step 514 that the configurable time period has expired, the method ends.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A system for managing trading orders of a trader, comprising:
   a processor; and
   a memory, communicatively coupled to the processor, that stores in a trader list that is associated in the memory with a first trader and that designates one or more other traders, in which the memory further stores instructions which, when executed by the processor, direct the processor to:
   receive a trading order from the first trader from a computer coupled to the processor over a network;
   after receiving the trading order from the first trader, transmit the trading order to a plurality of traders, wherein the plurality of traders does not comprise any of the one or more designated traders from the trader list;
   receive a specific trading order from a specific trader;
   receive at least two trading orders from a corresponding at least two traders not designated by the trader list; and
   transmit the specific trading order and the at least two trading orders to the first trader;
   determine that the specific trader is designated by the trader list;
   based on the determination that the specific trader is designated by the trader list, cause a display of the specific trading order at a display device to be dimmed or highlighted relative to a display of the at least two trading orders at the display device, in which the trader list designating the one or more other traders is stored before the acts of receiving the trading order from the first trader, receiving the specific trading order from the specific trader, and receiving the at least two trading orders from the corresponding at least two traders.

2. The system of claim 1, wherein:
the trading order is a first trading order for a first trading product;
the trader list is a first trader list associated in the memory with the first trading product; and
the first trader is further associated in the memory with a second trader list associated in the memory with a second trading product, the second trader list designating one or more traders.

3. The system of claim 1, wherein:
the trading order is a first trading order for a first trading product;
the trader list is a first trader list associated in the memory with the first trading product;
the plurality of traders is a first plurality of traders;
the first trader is further associated in the memory with a second trader list associated in the memory with a second trading product, the second trader list designating one or more traders; and
wherein the instructions, when executed by the processor, further direct the processor to:
receive from the first trader a second trading order for the second trading product;
transmit the second trading order to a second plurality of traders, wherein the second plurality of traders does not comprise any of the one or more traders designated by the second trader list; and
prevent the transmission of the second trading order to the one or more traders designated by the second trader list.

4. The system of claim 3, wherein the second trader list is different from the first trader list.

5. The system of claim 1, wherein the trading order is a first trading order, the trader list is a first trader list, and wherein the instructions, when executed by the processor, further direct the processor to:
receive a second trading order from a second trader, wherein the second trader is associated in the memory with a second trader list designating at least the first trader;
transmit the second trading order to a plurality of traders that does not comprise the first trader; and
prevent the transmission of the second trading order to the first trader.

6. The system of claim 1, wherein:
the trading order is for a trading product; and
wherein the instructions, when executed by the processor, further direct the processor to prevent the execution of a trade for the trading product between the first trader and the one or more designated traders.

7. The system of claim 1, wherein the trading order is part of an order price feed from the first trader.

8. The system of claim 7, wherein the order price feed:
is associated in the memory with a particular trading product; and
is a substantially real-time data stream representing at least an available quantity of the particular trading product from the first trader.

9. The system of claim 8, wherein each of the one or more designated traders are market makers that specialize in trading the particular trading product.

10. The system of claim 1, wherein the instructions, when executed by the processor, further direct the processor to, prior to transmitting the trading order, generate the trader list based at least in part on one or more trader preferences associated in the memory with the first trader.

11. The system of claim 1, wherein the instructions, when executed by the processor, further direct the processor to, prior to transmitting the trading order,
generate the trader list based at least in part on:
one or more trader preferences associated in the memory with the first trader; and
at least one trader profile associated in the memory with at least one designated trader.

12. The system of claim 11, wherein:
at least one of the one or more trader preferences is associated in the memory with a trading volume threshold; and
the at least one trader profile comprises a trading volume associated in the memory with the at least one designated trader, the trading volume satisfying the trading volume threshold.

13. The system of claim 11, wherein:
at least one of the one or more trader preferences is associated in the memory with a trading product; and
the at least one trader profile associated in the memory with the at least one designated trader indicates that the at least one designated trader specializes in trading the trading product.

14. The system of claim 11, wherein:
at least one of the one or more trader preferences is associated in the memory with a particular trading activity; and
the at least one trader profile associated in the memory with the at least one designated trader indicates that the at least one designated trader engaged in the particular trading activity.

15. The system of claim 1, wherein the instructions, when executed by the processor, further direct the processor to, prior to transmitting the trading order,
receive from the first trader a selection of at least one trader; and
generate the trader list based on the first trader's selection of the at least one trader, in which the trader list is generated to include the at least one trader.

16. The system of claim 1, wherein the instructions, when executed by the processor, further direct the processor to prevent the execution of the trading order by the one or more designated traders, wherein the act of preventing the execution of the trading order by the one or more designated traders comprises filtering the trading order from a data transmission to the one or more designated traders.

17. The system of claim 1, further comprising an interface server memory communicatively coupled to an interface server that stores instructions which, when executed by the interface server, directs the interface server to prevent the transmission of the trading order to the one or more designated traders.

18. A system for managing trading orders of a first trader, comprising:
a platform server;
a platform server memory communicatively coupled to the platform server that stores instructions which, when executed by the platform server, direct the platform server to:
receive a trading order from a first trader, wherein the first trader is associated in the memory with the trader list that designates the one or more other traders; and after receiving the trading order from the first trader, transmit the trading order to a plurality of traders;

an interface server associated in the memory with at least one designated trader from the trader list; and an interface server memory communicatively coupled to the interface server that stores instructions which, when executed by the interface server, directs the interface server to:

store the trader list; and prevent the transmission of the trading order to the at least one designated trader from the trader list;

receive a specific trading order from a specific trader;

receive at least two trading orders from a corresponding at least two traders not designated by the trader list; and transmit the specific trading order and the at least two trading orders to the first trader;

determine that the specific trader is designated by the trader list;

based on the determination that the specific trader is designated by the trader list, cause a display of the specific trading order to be dimmed or highlighted relative to a display of the at least two trading orders, in which the trader list designating the one or more other traders is stored before the acts of receiving the trading order from the first trader, receiving the specific trading order from the specific trader, and receiving the at least two trading orders from the corresponding at least two traders.

19. A method for managing trading orders of a trader, comprising:

storing by an interface server a trader list that is associated with a first trader in a memory operatively coupled to the processor and that designates one or more other traders;

receiving by the interface server a trading order from the first trader;

after receiving the trading order from the first trader, transmitting by the interface server the trading order to a plurality of traders, wherein the plurality of traders does not comprise any of the one or more designated traders from the trader list; and preventing by the interface server the transmission of the trading order to the one or more designated traders;

receiving by the interface server a specific trading order from a specific trader;

receiving by the interface server at least two trading orders from a corresponding at least two traders not designated by the trader list; and transmitting by the interface server the specific trading order and the at least two trading orders to the first trader;

determining that the specific trader is designated by the trader list;

based on the determination that the specific trader is designated by the trader list, cause a display of the specific trading order at a display device to be dimmed or highlighted relative to a display of the at least two trading orders at the display device, in which the trader list designating the one or more other traders is stored before the acts of receiving the trading order from the first trader, receiving the specific trading order from the specific trader, and receiving the at least two trading orders from the corresponding at least two traders.

20. The method of claim 19, wherein:
the trading order is a first trading order for a first trading product;

the trader list is a first trader list associated in the memory with the first trading product; and the first trader is further associated in the memory with a second trader list associated in the memory with a second trading product, the second trader list designating one or more traders.

21. The method of claim 19, wherein:

the trading order is a first trading order for a first trading product; the trader list is a first trader list associated in the memory with the first trading product;

the plurality of traders is a first plurality of traders; and the first trader is further associated in the memory with a second trader list associated in the memory with a second trading product, the second trader list designating one or more traders; and further comprising:

receiving from the first trader a second trading order for the second trading product, in which the second trading order is received by the interface server;

transmitting the second trading order to a second plurality of traders, wherein the second plurality of traders does not comprise any of the one or more traders designated by the second trader list; and preventing the transmission of the second trading order to the one or more traders designated by the second trader list.

22. The method of claim 21, wherein the second trader list is different from the first trader list.

23. The method of claim 19, wherein the trading order is a first trading order and the trader list is a first trader list, and further comprising:

receiving a second trading order from a second trader, wherein the second trader is associated in the memory with a second trader list designating at least the first trader;

transmitting the second trading order to a plurality of traders that does not comprise the first trader; and preventing the transmission of the second trading order to the first trader.

24. The method of claim 19, wherein the trading order is for a trading product, and further comprising preventing the execution of a trade for the trading product between the first trader and the one or more designated traders.

25. The method of claim 19, wherein the trading order is part of an order price feed from the first trader.

26. The method of claim 25, wherein the order price feed:
is associated in the memory with a particular trading product; and is a substantially real-time data stream representing at least an available quantity of the particular trading product from the first trader.

27. The method of claim 26, wherein each of the one or more designated traders are market makers that specialize in trading the particular trading product.

28. The method of claim 19, further comprising, prior to transmitting the trading order, generating the trader list based at least in part on one or more trader preferences associated in the memory with the first trader.

29. The method of claim 19, further comprising, prior to transmitting the trading order, generating the trader list based at least in part on: one or more trader preferences associated in the memory with the first trader; and at least one trader profile is associated in the memory with at least one designated trader.

30. The method of claim 29, wherein:
at least one of the one or more trader preferences is associated in the memory with a trading volume threshold; and the at least one trader profile comprises a trading volume associated in the memory with the at least one designated trader, the trading volume satisfying the trading volume threshold.

31. The method of claim 29, wherein:
at least one of the one or more trader preferences is associated in the memory with a particular trading product; and
the at least one trader profile associated in the memory with the at least one designated trader indicates that the at least one designated trader specializes in trading the particular trading product.

32. The method of claim 29, wherein:
at least one of the one or more trader preferences is associated in the memory with a particular trading activity; and
the at least one trader profile associated in the memory with the at least one designated trader indicates that the at least one designated trader engaged in the particular trading activity.

33. The method of claim 19, further comprising, prior to transmitting the trading order,
receiving from the first trader a selection of the one or more other traders; and
in which the act of determining the one or more traders designated on the trader list comprises generating the trader list based on the first trader's selection of the one or more other traders so that the trader list includes the one or more other traders.

34. The method of claim 19, further comprising preventing the execution of the trading order by the one or more designated traders, wherein the act of preventing the execution of the trading order by the one or more designated traders comprises filtering the trading order from a data transmission to the one or more designated traders.

35. The method of claim 19, wherein preventing the transmission of the trading order to the one or more designated traders is performed by at least one interface server associated in the memory with the one or more designated traders.

36. A computer-readable medium that stores instructions which, when executed by a processor, direct the processor to:
receive a trading order from a first trader associated in a memory with a trader list that designates one or more other traders;
transmit the trading order to a plurality of traders, wherein the plurality of traders does not comprise any of the one or more designated traders from the trader list;
prevent the transmission of the trading order to the one or more designated traders;
receive by the interface server a specific trading order from a specific trader;
receive by the interface server at least two trading orders from a corresponding at least two traders not designated by the trader list; and
transmit by the interface server the specific trading order and the at least two trading orders to the first trader;
determine that the specific trader is designated by the trader list;
based on the determination that the specific trader is designated by the trader list, cause a display of the specific trading order at a display device to be dimmed or highlighted relative to a display of the at least two trading orders at the display device,
in which the trader list designating the one or more other traders is stored before the acts of receiving the trading order from the first trader, receiving the specific trading order from the specific trader, and receiving the at least two trading orders from the corresponding at least two traders.

37. The computer-readable medium of claim 36, wherein:
the trading order is a first trading order for a first trading product;
the trader list is a first trader list associated in the memory with the first trading product; and
the first trader is further associated in the memory with a second trader list associated in the memory with a second trading product, the second trader list designating one or more traders.

38. The computer-readable medium of claim 36, wherein:
the trading order is a first trading order for a first trading product;
the trader list is a first trader list associated in the memory with the first trading product;
the plurality of traders is a first plurality of traders;
the first trader is further associated in the memory with a second trader list associated in the memory with a second trading product, the second trader list designating one or more traders, in which the second trader list is different from the first trader list; and
the instructions, when executed by the processor, further direct the processor to:
receive from the first trader a second trading order for the second trading product;
transmit the second trading order to a second plurality of traders, wherein the second plurality of traders does not comprise any of the one or more traders designated by the second trader list; and
prevent the transmission of the second trading order to the one or more traders designated by the second trader list.

39. The computer-readable medium of claim 36, wherein the trading order is a first trading order, the trader list is a first trader list, and the instructions, when executed by the processor, further direct the processor to:
receive a second trading order from a second trader, wherein the second trader is associated in the memory with a second trader list designating at least the first trader;
transmit the second trading order to a plurality of traders that does not comprise the first trader; and
prevent the transmission of the second trading order to the first trader.

40. The computer-readable medium of claim 36, wherein:
the trading order is for a trading product; and
the instructions, when executed by the processor, further direct the processor to prevent the execution of a trade for the trading product between the first trader and the one or more designated traders.

41. The computer-readable medium of claim 36, wherein the trading order is part of an order price feed from the first trader, wherein the order price feed:
is associated in the memory with a particular trading product; and
is a substantially real-time data stream representing at least an available quantity of the particular trading product from the first trader.

42. The computer-readable medium of claim 41, wherein each of the one or more designated traders are market makers that specialize in trading the particular trading product.

43. The computer-readable medium of claim 36, wherein the instructions, when executed by the processor, further direct the processor to, prior to transmitting the trading order, generate the trader list based at least in part on one or more trader preferences associated in the memory with the first trader.

44. The computer-readable medium of claim 36, in which comprising the instructions, when executed by the processor, further direct the processor to prevent the execution of the trading order by the one or more designated traders, wherein the act of preventing the execution of the trading order by the one or more designated traders comprises filtering the trading order from a data transmission to the one or more designated traders.

45. A system for managing order price feeds, comprising:
a processor; and
a memory, communicatively coupled to the processor, that:
stores a passive trading order from a first trader, the passive trading order comprising an order for a particular trading product; and
stores instructions which, when executed by the processor, directs the processor to:
receive an order price feed from a second trader, the order price feed being a substantially real-time data stream representing an available quantity of the particular trading product from the second trader;
store a trader list of a second trader, in which the trader list designates a third trader but not the first trader;
determine that a best price in a trading system satisfies a configurable threshold, in which the best price comprises one of a best bid price and a best offer price;
based on the act of determining that the best price satisfies a configurable threshold, use the order price feed to aggress at least the passive trading order from the first trader;
prevent the order price feed from aggressing against a trading order from the third trader;
receive a specific trading order from a specific trader designated by the trader list;
receive at least two trading orders from a corresponding at least two traders not designated by the trader list; and
transmit the specific trading order and the at least two trading orders to the first trader;
determine that the specific trader is designated by the trader list;
based on the determination that the specific trader is designated by the trader list, cause the specific trading order and the at least two trading orders to be displayed at a display device to the first trader, wherein the display of any orders from a trader designated by the trader list, including the display of the specific trading order from the specific trader, is dimmed or highlighted relative to the display at the display device of the at least two trading orders,
in which the trader list designating the one or more other traders is stored before the acts of receiving the trading order from the first trader, receiving the specific trading order from the specific trader, and receiving the at least two trading orders from the corresponding at least two traders.

46. The system of claim 45, in which the act of preventing the order price feed from aggressing against a trading order from the third trader comprises:
deleting the trading order from one or more queues associated in the memory with the third trader.

47. The system of claim 45, in which the act of preventing the order price feed from aggressing against a trading order from the third trader comprises:
filtering the trading order from one or more data streams associated in the memory with the third trader.

48. The system of claim 45, in which the act of preventing the order price feed from aggressing against a trading order from the third trader comprises:
routing the trading order away from the third trader.

49. The system of claim 1, in which the act of determining the one or more other traders designated on the trader list comprises:
receiving from the first trader one or more preferences about counterparty traders, in which the one or more preferences comprises one or more criteria concerning at least one of:
a particular trading product;
a particular trading activity of a counterparty trader; and
a trading volume threshold;
determining at least one trader who satisfies the one or more criteria; and
generating the trader list based on the act of determining the at least trader who satisfies the one or more criteria, in which the act of generating the trader list comprises generating the trader list to designate the at least one trader.

50. The system of claim 49, in which the act of determining at least one trader who satisfies the one or more criteria comprises:
comparing the criteria to a plurality of trader profiles, each trader profile associated with a trader;
based on the act of comparing, determining that the at least one trader satisfies the one or more criteria.

51. The system of claim 1, further comprising:
deleting the trading order from one or more queues associated in the memory with those traders designated by the trader list.

52. The system of claim 1, further comprising:
routing the trading order away from those traders designated by the trader list.

53. The system of claim 1, wherein the instructions, when executed by the processor, further direct the processor to:
receive a second trading order from a second trader, wherein the second trader is designated by the trader list;
receive a third trading order from a third trader, wherein the third trader is not designated by the trader list;
receive a fourth trading order from a fourth trader, wherein the fourth trader is not designated by the trader list; and
cause the second trading order, the third trading order, and the fourth trading order to be displayed to the first trader, wherein the display of the second trading order is dimmed or highlighted relative to the display of the third trading order and the display of the fourth trading order.

54. The system of claim 1, wherein the instructions, when executed by the processor, further direct the processor to:
update the trader list based on recent trading activity.

55. The system of claim 1, wherein the instructions, when executed by the processor, further direct the processor to:
update the trader list daily based on recent trading activity.

56. The system of claim 1, wherein the instructions, when executed by the processor, further direct the processor to:
update the trader list weekly based on recent trading activity.

57. The system of claim 1, wherein the instructions, when executed by the processor, further direct the processor to:
update the trader list periodically according to a configurable period based on recent trading activity.

58. The system of claim 11, wherein:
at least one of the one or more trader preferences is associated in the memory with a trading volume threshold; and
the at least one trader profile comprises a trading volume associated in the memory with the at least one designated trader, the trading volume satisfying the trading volume threshold.

59. The system of claim 1, further comprising preventing the transmission of the trading order to the one or more designated traders.

60. The system of claim 1, further comprising preventing the transacting of a trade of the trading order the with the one or more designated traders.

61. The system of claim 1, in which the trader list comprises one or more traders associated with an order price feed selected by the first trader.

62. The system of claim 1, in which the trader list comprises all traders that are not associated in the memory with an order price feed selected by the first trader.

* * * * *